June 30, 1959  W. A. PATTERSON  2,892,698
APPARATUS AND METHOD FOR HEATING AND PRODUCING
CHEMICAL CHANGE IN FINELY DIVIDED ORES
Filed Dec. 27, 1955  2 Sheets-Sheet 2
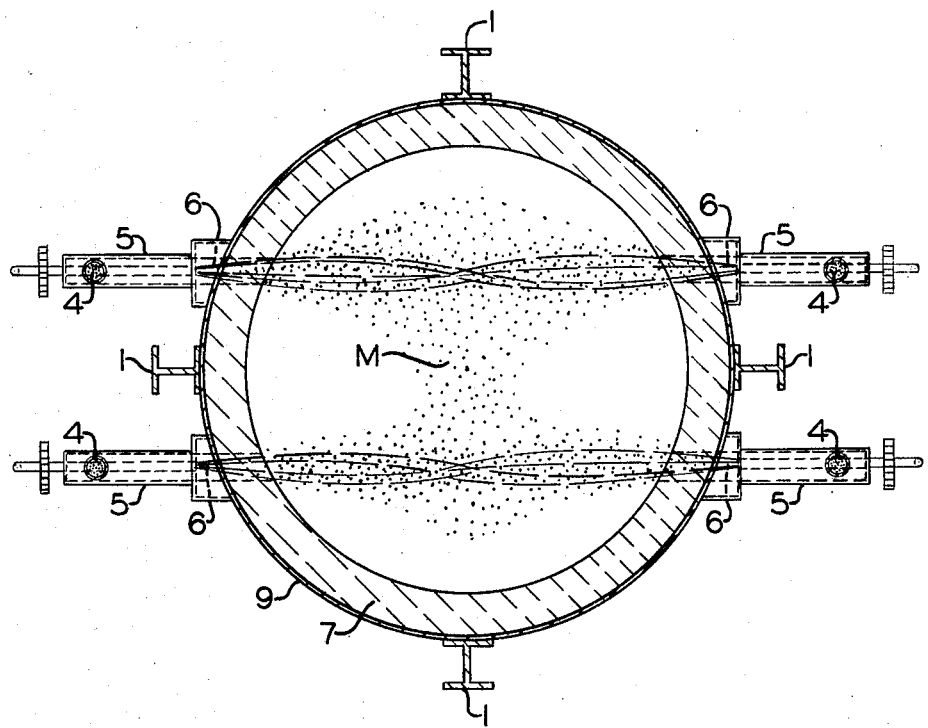
Fig II
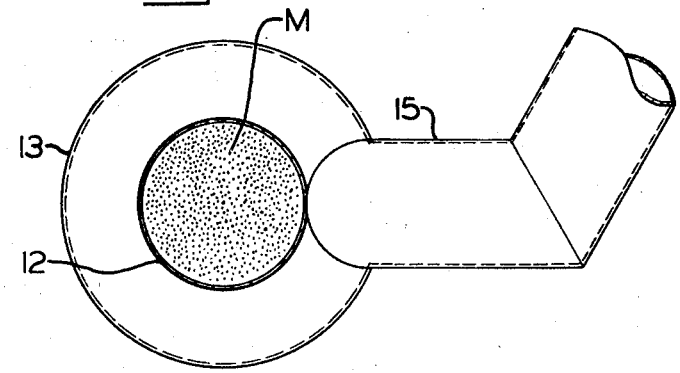
Fig III
INVENTOR
WILLIAM A. PATTERSON
BY Lloyd F. Engle, Jr.
ATTORNEY

United States Patent Office 2,892,698
Patented June 30, 1959

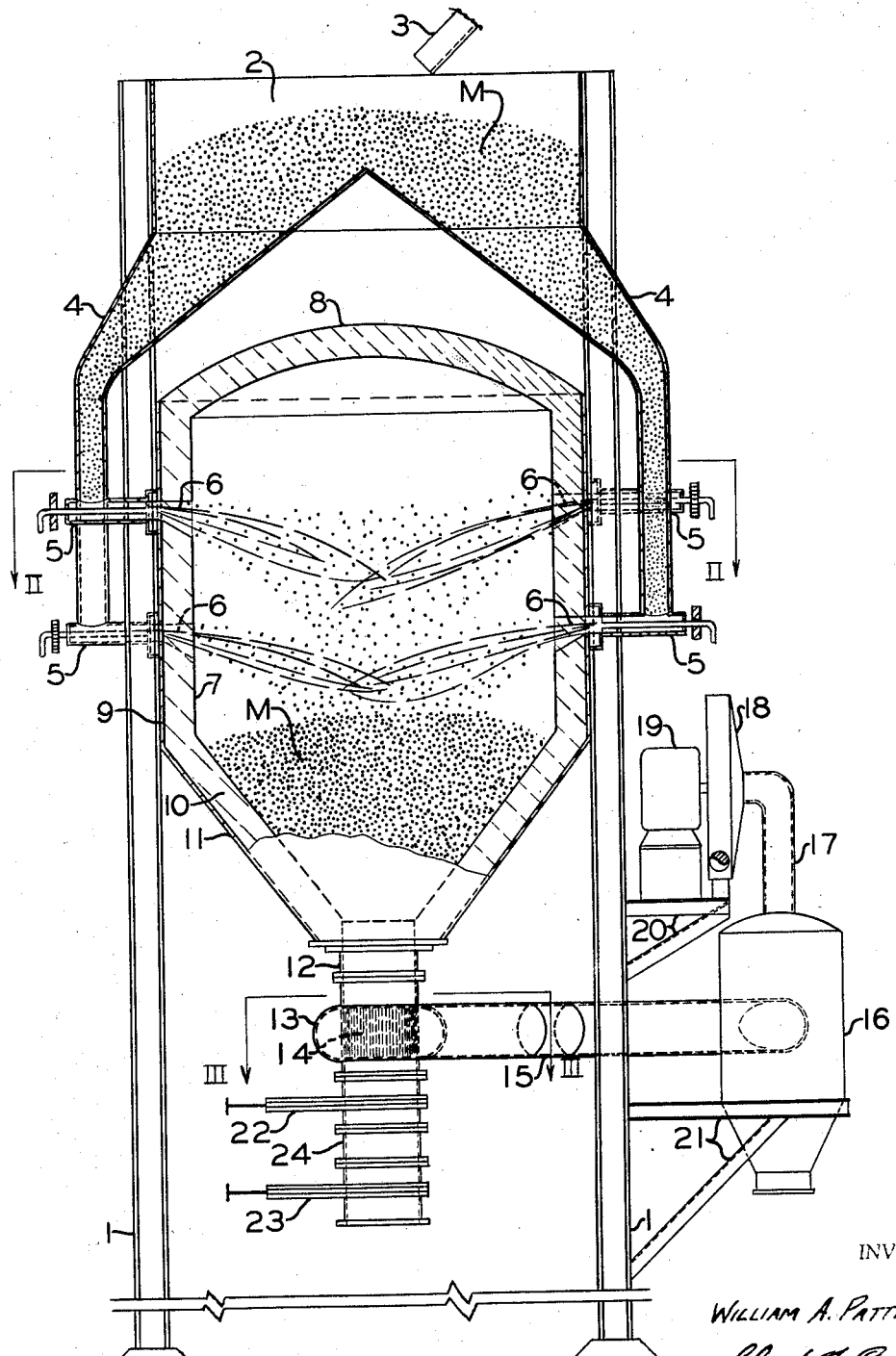
Fig I

2,892,698

APPARATUS AND METHOD FOR HEATING AND PRODUCING CHEMICAL CHANGE IN FINELY DIVIDED ORES

William A. Patterson, Washington, Pa., assignor to Fort Pitt Bridge Works, Pittsburgh, Pa., a corporation of Pennsylvania Application December 27, 1955, Serial No. 555,523

6 Claims. (Cl. 75—26)

This invention pertains to apparatus and method for preparatory heating and producing a chemical change in finely divided metallic ores. More particularly this invention relates to apparatus for heating and producing a chemical change in finely divided metallic ores mixed with finely divided carbonaceous material in a quiescent incandescent mass or simply in the finely divided ores alone, and to the method whereby such chemical change is produced.

The apparatus and method covered by the following description and the appended claims may be employed in the treatment of a widely variant class of ores, but the most apparent utility thereof is found in the treatment and reduction of metallic ores in the form of oxides.

The apparatus and methods in prior use for heating and reducing metallic ores in the form of oxides have fundamentally comprised stationary or agitating furnaces in which the said ore was heated to variant high temperatures in the presence of carbon or some other suitable reducing agent, in all of which processes the resulting gases and the gases produced by combustion at the heat source for such furnaces were drawn off from the top of the heated mass of ores being treated. In many of the furnaces in prior use, the charge of material to be heated was introduced into the furnace at a temperature considerably below the efficient reducing temperature, thereby requiring the necessary heat to be imparted to the material in a mass as compared with the more efficient process of heating the particles individually as in my method. Even in those apparati where an attempt was made to raise the temperature of the material upon introduction into the furnace, it was not possible to impart sufficient initial heat to the material to cause the reduction process to commence until the material had been exposed to the heat of the furnace for a relatively long period. Where attempts were made to accelerate the heating by increasing the temperature of the furnace, the gangue became plastic and surrounded the metallic oxides, thereby prohibiting reduction.

It is well known that in the reduction of iron ore, for example, the chemical change takes place in the presence of carbon and CO gas at all temperatures between 600° F. and 1800° F. in proportionately accelerated degrees. If the temperature is increased appreciably beyond 1800° F. the gangue becomes plastic and defeats the reduction process as aforementioned. I have observed that the CO gas produced by the combustion at the heat source can be utilized advantageously in the reduction process if it can be brought into proximity with the material to be reduced when the temperature of the material is within the range where reduction will take place and preferably near the upper limit thereof. Consequently, it is efficient and economically advantageous to draw the hot gaseous products of combustion through the quiescent incandescent mass of material comprising the finely divided ores and the finely divided carbonaceous material in order that the reducing qualities of these gases may be utilized rather than wasted by being discharged above the said mass. In addition, where the process being conducted is not reduction but merely the roasting of the metallic ore being treated to remove undesirable constituents therefrom, as in the de-sulphurization of molybdenum disulphite ($MoS_2$), it is also efficient and economically advantageous to utilize the residual heat from the hot gaseous products of combustion by drawing them through the quiescent mass of material.

The metallic ores which are industrially treated, as by reducing, have a relatively high specific heat, and therefore resist the imparting of heat to them. Since the said ores are susceptible of the desired chemical change at variant high temperatures, it is important that they should be brought to those temperatures quickly so that the said chemical change may commence without delay.

Therefore, one object of this invention is to accomplish a highly efficient reduction of finely divided metallic ores in the form of oxides by providing a heat source which will quickly raise the said ores to the reduction range and also produce CO gases to surround the heated particles of the said ores and produce the said reduction. A further object of this invention is to accomplish a highly efficient reduction of finely divided metallic ores in the form of oxides by utilizing the CO gases produced by the combustion at the said heat source to bring about the reduction of the said ores at rest in the mass comprising the said finely divided ores mixed with finely divided carbonaceous material. A further object of this invention is to provide an apparatus and method for roasting and reducing finely divided metallic ores, which apparatus and method possess sufficient flexibility to accommodate different types of metallic ores and different qualities of the same ore. A still further object of this invention is to provide an economical means of reducing metallic ores. Further and additional objects will appear from the following description and the appended claims.

Briefly to describe the primary features of an apparatus and method for reducing finely divided metallic ores in the form of oxides embodying my invention, I provide a cylindrical vertical furnace lined with refractory material and having an inverted conical bottom. The finely divided metallic ore mixed with finely divided carbonaceous material is introduced into one or more of the feeding and heating apparati similar to that described in my co-pending application Serial No. 538,581, filed October 5, 1955, mounted on the upper portion of the side of the said furnace. From the said feeding and heating apparatus, the finely divided material is projected within and around the flame and hot gaseous products of combustion therefrom through a combustion tunnel into the said furnace and descends, by the force of gravity and the direction of circulation of the said hot gases, to the top of the quiescent incandescent mass comprising the material previously charged by the same method. During the aforesaid trajectory, the finely divided material comprising metallic ore and carbonaceous material is exposed to the flame and hot gaseous products of combustion from the heat source and a high initial heat is imparted to the particles of ore while, at the same time, the particles of carbonaceous material are ignited. At the bottom of the inverted conical base of the said furnace there is a cylindrical outlet therefrom, a portion of which is pierced with vertical slots in its outer periphery, and surrounding that portion is the gas off-take annulus which connects with the gas off-take pipe and a fan to provide the suction required to pull the hot gaseous products of combustion into and through the quiescent incandescent mass of material, in order that the $CO_2$ gas produced at the combustion source will act with the incandescent carbonaceous material to form CO gas which is advantageously utilized in the reduction process along with the CO gas produced at the combustion source.

Below the gas off-take pipe are two valves or gates which are alternately opened and closed, by exteriorly operative means, at proper intervals to effect the discharge of a portion of the mass already reduced. This renders the process intermittent in a sense and keeps the quiescent incandescent mass moving downward in the inverted conical bottom of the furnace, which shape is particularly well adapted to cause the rearrangement of the particles of material and effect the maximum exposure thereof to the reducing gases.

Since a reduced metallic ore will rapidly revert to its oxide form while within the reduction temperature range if air or oxygen, available for oxidation, is present, these valves or gates as well as the furnace generally are made as nearly air-tight as possible, and all portions of the furnace which are in contact with the heated material are lined with refractory material to protect the structure and to avoid excessive heat loss.

By regulating the feeding means of my feeding and heating apparatus, which is accomplished independently of the variable heating means, the feeding process becomes continuous for all practical purposes as regards a particular type and quality of material. Of course the incorporation of the feeding and heating apparatus described in my co-pending application, Serial No. 538,581, is not essential to the apparatus nor to the method described herein, for the heat and the reducing gas may be applied independently of each other and independently of the projection of the finely divided material. However, it is thought that such an incorporation renders the desired result more efficiently and economically accomplished.

The gases produced by the combustion of fuel gas or oil occurring at the feeding and heating apparatus, comprising mainly $CO$, $CO_2$, $N$, and $H_2$, are drawn down through the quiescent incandescent mass in order that the $CO$ from the combustion, and the additional $CO$ produced by the $CO_2$ acting with the incandescent carbonaceous material, may be utilized in the reduction process, rather than wasted as in the prior practice of withdrawing the gaseous products of combustion from the furnace above the mass of material. Admittedly, there is an interaction between the $CO$ and $CO_2$ gas, but that difficulty is resolved by the fact that the excess of carbon, which is present in my method, in a finely divided incandescent form, renders such interaction minimal in amount.

It will be obvious from the foregoing analysis that the reduction may also be accomplished in the finely divided metallic ore without the presence of carbonaceous material, by depending entirely upon the $CO$ produced by the combustion of the fuel gas or oil. However, such a procedure is less efficient and less economical, and would be feasible only in situations where carbonaceous material is not available.

Fig. I is an elevational cross-sectional view through my heating and reducing apparatus.

Fig. II is a horizontal cross-sectional view through my heating and reducing apparatus taken in the plane of section line II—II of Fig. I.

Fig. III is a horizontal cross-sectional view through my heating and reducing apparatus taken in the plane of section line III—III of Fig. I.

Referring to the drawings, a plurality of upright columns 1—1 support the component parts of my heating and reducing apparatus and extend upward to provide support for the hopper 2 into which the finely divided material, comprising a mixture of ore and carbonaceous material or simply the ore alone, generally designated M, is introduced through the chute 3. A plurality of chutes 4—4 communicate with the hopper 2 and conduct the finely divided material to a plurality of heating and feeding apparati 5—5 which are of the type shown and described in my co-pending application Serial No. 538,581. Within the heating and feeding apparati 5—5, the finely divided material is borne by the hot gaseous products of combustion and projected within and around the flame and hot gases through combustion tunnels 6—6 into the heating and reducing furnace comprising sides 7 and roof 8 of refractory material and being laterally encased by a steel shell 9. The finely divided material then descends to the conical shaped bottom of the furnace comprising the refractory material lining 10 and the steel casing 11. The outlet pipe 12 connects to the bottom of the furnace and descends vertically passing through the gas off-take annulus 13. The portion of the outlet pipe 12 which is contained within the gas off-take annulus 13 is pierced with vertical slots 14 encompassing its complete circumference which are of such width as to permit the free passage of the gases produced by the process being conducted while at the same time restricting the passage therethrough of the finely divided material. The gas off-take pipe 15 communicates with the gas off-take annulus 13 and connects to a centrifugal type dust collector 16 which is connected by the pipe 17 to the fan 18. The fan 18 and the drive motor 19 therefor are mounted upon the support 20 which connects to the column 1, and the dust collector 16 is mounted upon the support 21 which also connects to the column 1. Valve 22 and valve 23 are inserted into the outlet pipe 12 and enclose the discharge chamber 24 to allow the intermittent discharge of the finally treated material.

The apparatus may be modified by using only certain of the heating and feeding apparati 5 depending upon the process being conducted and the heat and feeding volume required therefor. This constitutes an important feature of the novelty and utility of the apparatus embodying my invention in that its versatility is extended thereby to permit the economic and efficient processing of a greater variety of materials.

In operation, the finely divided materials comprising the material to be treated and carbonaceous material or simply the material to be treated alone, depending upon the process being conducted, are introduced from the chute 3 into the hopper 2 in their final form for treating. The material then descends through chutes 4 to the heating and feeding apparati 5 from which it is fed and projected, in and around the flame and hot gaseous products of combustion, through the combustion tunnels 6 into the treating furnace. During this projection of the material, a high initial heat is imparted to it, and the carbonaceous material, if any, is ignited. Within the treating furnace, the material descends to the bottom thereof to remain as a mass during the treating process with the exception of the movement occurring at the intermittent discharge intervals. The mass will, of course, be incandescent in those processes where carbonaceous material is included with the material being treated, as in the reduction of iron ore, and the desired degree of incandescence can be obtained by regulating the quantity of air or oxygen supplied through the heating and feeding apparati. The downward trajectory of the material results from gravity and the direction of the hot gaseous products of combustion which are drawn downward into and through the mass rather than being exhausted above it as in apparati and methods in prior use in the art. During the intervals of discharge of the treated material, the material being treated moves downward in the conical shaped furnace bottom, which shape is particularly adapted to cause a rearrangement of the particles of material and effect a maximum exposure thereof to the treating elements. The suction created by the fan 18 draws the reducing gases down through the mass of material being treated and out through the vertical slots 14 into the gas off-take annulus 13 and thence through the gas off-take pipe 15 to the dust collector 16 where any particles, which may have escaped through the vertical slots 14, are removed therefrom and recovered for reuse. From the dust collector 16, the gases are drawn through the pipe 17 to the fan 18 where they may be exhausted or utilized as a hot, high CO content gas at the combustion source or for the preparatory drying and heating of material to be introduced into the hopper 2. The vertical slots 14 may, of course, be replaced by holes, screens and other forms of openings, but the vertical slots are thought to be preferable in operation in that the natural movement of the material, while the process progresses, tends to clear them and keep them maximally unobstructed. The discharge of the treated material is accomplished by closing valve 23 and opening valve 22 to admit a quantity of the treated material into the chamber 24, and then closing valve 22 and opening valve 23 to complete the discharge. The material may be discharged directly into a final preparation furnace such as an open hearth or electric arc furnace or cooled below the reaction temperature in the absence of air for magnetic separation in the case of iron ore, or it may be discharged and stocked for later use as in the case of ores which do not readily oxidize.

The number of heating and feeding apparati utilized, the variable speed of the feeding means and the adjustability of the various phases of combustion are cooperative factors in rendering the process practically continuous even though the discharge of treated material may be necessarily intermittent in some instances.

An important feature of the novelty and utility of my invention is found in the arrangement of the structure comprising means for drawing the hot gaseous products of combustion through the heated porous mass of material being treated and thereby increasing the efficiency and economy of the treating process.

An additional important feature is found in the flexibility and versatility of operation comprising independently variable conditions of combustion, rates of feed, and fan suction to accommodate the processing of different materials possessing a broad scope of characteristics.

A further important feature is found in the economy and efficiency of operation comprising an apparatus which is capable of performing the processes of treating metallic ores without requiring the aid of other related processes and may therefore be installed in remote areas, proximate the supply of the material to be treated.

In order that the gases of combustion may be drawn through the mass of material being treated, it is necessary that the mass possess sufficient porosity therefor. In conducting the process of reducing iron ore, the porosity of the mass is accomplished by the mixing of the carbonaceous material therewith. In conducting the processes where the addition of carbonaceous material is not desirable or not necessary, the required porosity can be accomplished by mixing other porous substances with the finely divided ore, such as limestone slag for example, and effecting a separation after the desired chemical change has been accomplished.

Certain changes may be made in the arrangement set forth in the specifications and shown in the drawings, it being understood that modifications in the precise embodiment of the invention may be made within the scope of the following claims without departing from the spirit of the invention.

I claim as my invention:

1. A device for heating and reducing finely divided metallic ore in the form of an oxide comprising a cylindrical vertical furnace having mounted on the upper portion of the sides thereof means for effecting combustion of fuel gas or oil to produce a hot reducing gas and means for heating and feeding the said finely divided ore into the said furnace within and around the combustion flame and the said hot reducing gas projected into the said furnace, an inverted conical bottom for the said furnace connecting with a vertical cylindrical outlet at its apex, peripheral apertures in a portion of the said cylindrical outlet which communicate with a gas off-take annulus circumferentially enveloping the apertured portion of the said outlet, a gas off-take pipe connecting with the said gas off-take annulus, means for creating suction communicating with the said gas off-take pipe, and externally operative valves enclosing the lower extremity of the said outlet.

2. A device for heating and reducing finely divided metallic ore in the form of an oxide mixed with finely divided carbonaceous material comprising a cylindrical vertical furnace having mounted on the upper portion of the sides thereof means for effecting combustion of fuel gas or oil to produce a hot reducing gas and means for heating and feeding the said finely divided ore mixed with the said finely divided carbonaceous material into the said furnace within and around the combustion flame and the said hot reducing gas projected into the said furnace, an inverted conical bottom for the said furnace connecting with a vertical cylindrical outlet at its apex, peripheral apertures in a portion of the said cylindrical outlet which communicate with a gas off-take annulus circumferentially enveloping the apertured portion of the said outlet, a gas off-take pipe connecting with the said gas off-take annulus, means for creating suction communicating with the said gas off-take pipe, and externally operative valves enclosing the lower extremity of the said outlet.

3. A device for heating and producing a chemical change in finely divided metallic ore comprising a cylindrical vertical furnace having mounted on the upper portion of the sides thereof means for projecting flame and hot gaseous products of combustion into the said furnace and means for heating and feeding the said finely divided ore into the said furnace within and around the said flame and hot gaseous products of combustion, an inverted conical bottom for the said furnace connecting with a vertical cylindrical outlet at its apex, peripheral apertures in a portion of the said cylindrical outlet which communicate with a gas off-take annulus circumferentially enveloping the apertured portion of the said outlet, a gas off-take pipe connecting with the said gas off-take annulus, means for creating suction communicating with the said gas off-take pipe, and an externally operative valve enclosing the lower extremity of the said outlet.

4. The method of heating and reducing finely divided metallic ore in the form of an oxide by projecting the particles of the said ore into a furnace, subjecting them to heat and hot reducing gas to heat and partially reduce the particles of the said ore as they descend in the said furnace to a quiescent particulate mass of the said ore at the bottom thereof, and drawing the said reducing gas into and through the said quiescent mass.

5. The method of heating and reducing finely divided metallic ore in the form of an oxide mixed with finely divided carbonaceous material by projecting the particles of the said ore and carbonaceous material into a furnace, subjecting them to the heat and hot gaseous products of combustion of fuel gas or oil to heat and partially reduce the particles of the said ore and ignite the particles of the said carbonaceous material as they descend in the said furnace to a quiescent incandescent particulate mass of the said ore and carbonaceous material at the bottom thereof, and drawing the said hot gaseous products of combustion into and through the said quiescent incandescent mass.

6. The method of heating and producing a chemical change in finely divided metallic ore by projecting the particles of the said ore into a furnace, subjecting them to the heat of combustion of fuel gas or oil to heat and partially produce a chemical change in the particles of the said ore as they descend in the said furnace to a quiescent particulate mass of the said ore at the bottom thereof, and drawing the hot gaseous products of the said combustion into and through the said quiescent mass.

(References on following page)

References Cited in the file of this patent

UNITED STATES PATENTS

| | | |
|---|---|---|
| 774,930 | Brown | Nov. 15, 1904 |
| 865,658 | Scott | Sept. 10, 1907 |
| 1,678,932 | Buhler | July 31, 1928 |
| 2,085,625 | Anderson | June 29, 1937 |
| 2,184,300 | Hodson et al. | Dec. 26, 1939 |
| 2,249,410 | Wilson | July 15, 1941 |
| 2,313,019 | Lohse | Mar. 2, 1943 |
| 2,384,971 | Silvasy et al. | Sept. 18, 1945 |
| 2,503,555 | Lykken | Apr. 11, 1950 |
| 2,667,342 | Ellerbeck | Jan. 26, 1954 |